Sept. 20, 1971  H. G. DORN  3,606,454
SEAT BELT

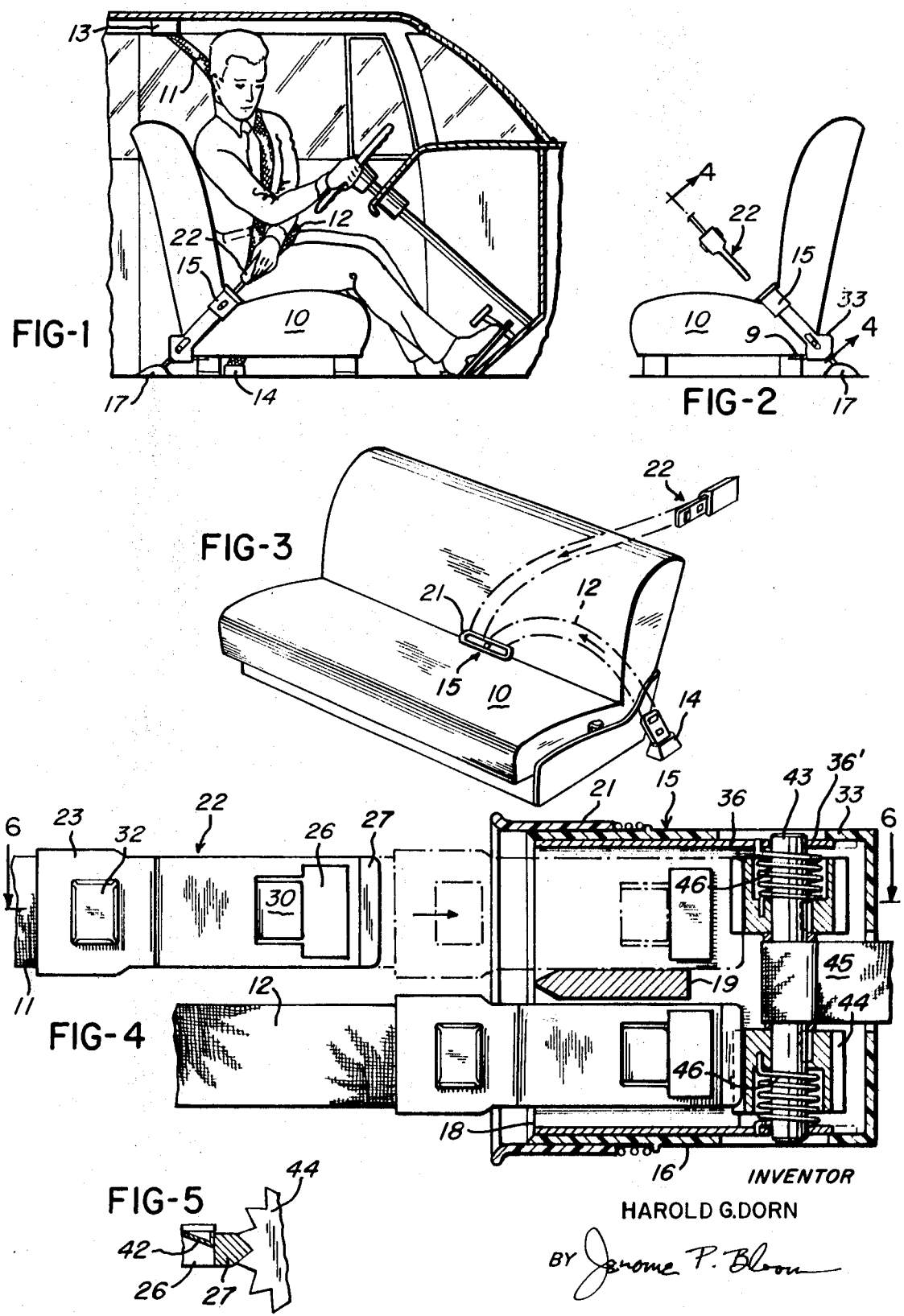

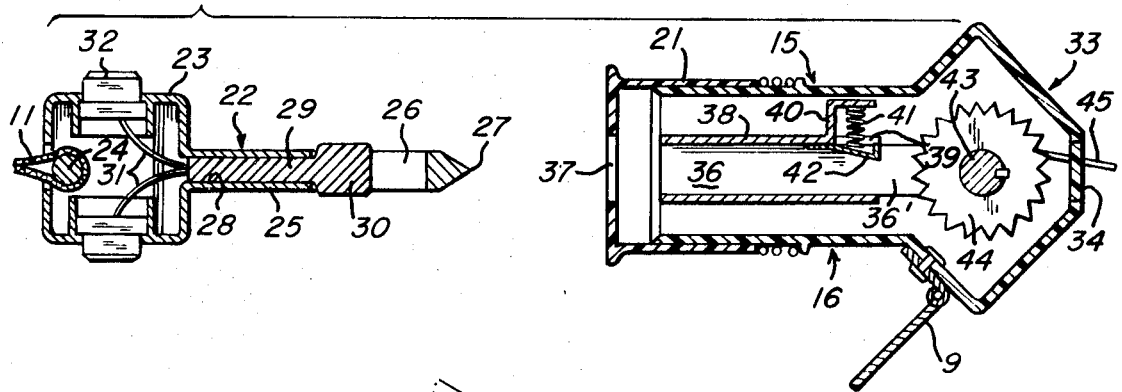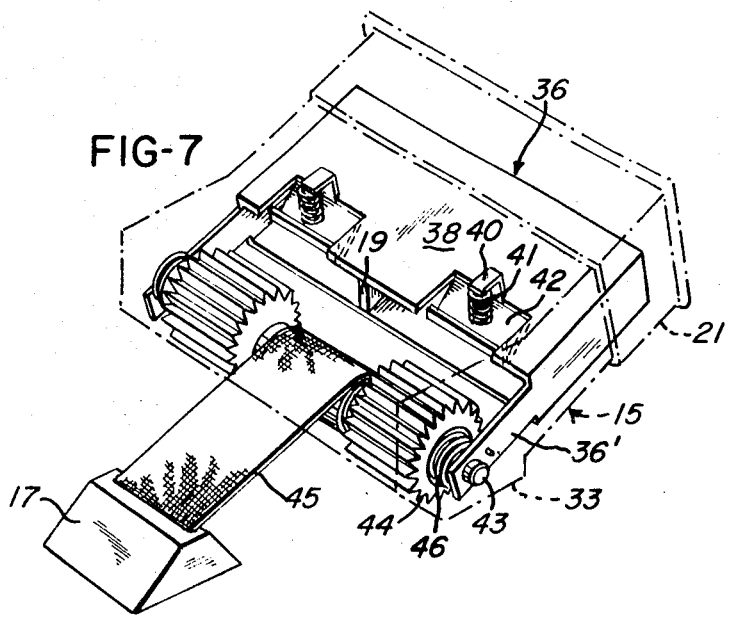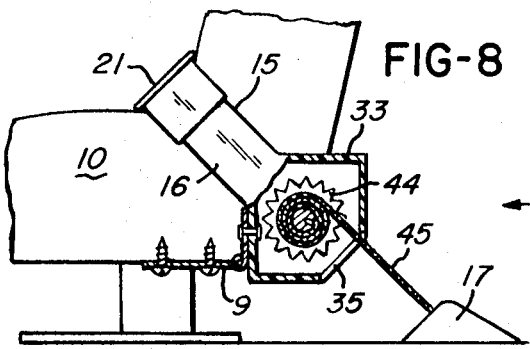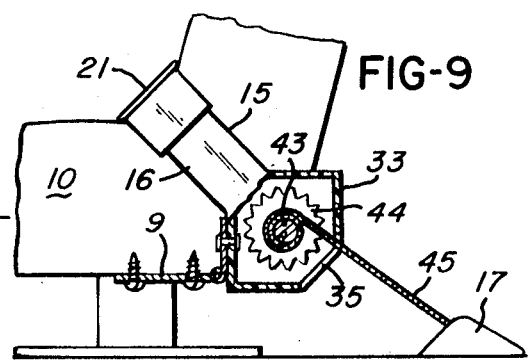
INVENTOR
HAROLD G. DORN

Filed Aug. 21, 1969  3 Sheets-Sheet 3

INVENTOR
HAROLD G. DORN

BY Jerome P. Bloom

ATTORNEY

United States Patent Office 3,606,454
Patented Sept. 20, 1971

3,606,454
SEAT BELT
Harold G. Dorn, 4717 Manchester Drive,
Middletown, Ohio 45042
Filed Aug. 21, 1969, Ser. No. 851,822
Int. Cl. B60r 21/10
U.S. Cl. 297—385                                    13 Claims

ABSTRACT OF THE DISCLOSURE

A seat or safety belt device in which one of the usual pair of interconnecting belt segments is eliminated. The single belt element used is adapted for insertion in a receptacle installed between a seat and backrest, which receptacle is uniquely adapted to accommodate adjustment of the seat. Manipulative means on the belt element utilized permits the locking and release of the belt using only one hand.

BACKGROUND OF THE INVENTION

This invention relates to belt restraints, particularly as used in vehicles to reduce the likelihood of injury to riders. Such restraints are commonly identified as seat belts since it is their function to confine a driver or passenger to the seat in an automotive or other vehicle, as a safety precaution, in the event of collision, unexpected movement, or a sudden stop of the vehicle.

Safety belts for vehicles exist in lap and shoulder forms. In either case, as known heretofore it comprises a pair of dangling belt segments individually connected at their one ends to the vehicle frame and having at their opposite ends complementary buckle portions. The belt segments are in use brought across the body and joined together by an interlocking action of buckle portions. The use of seat belts has grown to invariably include a combination of both lap and shoulder units and to provide multiple sets of belt units at front and rear seat locations.

Although the utility of seat belts is recognized, it is also obvious that their presence in a conventional form gives a cluttered appearance to vehicle seats. Moreover, their application and adjustment requires manipulative activity which normally demands the use of both hands, influencing many people to neglect their use. Further, conventional safety belt installations lack flexibility as to the accommodation of seat adjustment and the disposition of their fastening elements many times cause uncomfortable seating conditions. In addition, it is not unusual for a driver of a vehicle who has neglected to fasten his seat belt before starting to wish to do so while the vehicle is moving. This he cannot do, using prior are devices, without removing both hands from the steering wheel since the buckle ends of the belt segments are not readily joined together, even with a use of both hands.

BRIEF SUMMARY OF THE INVENTION

In using the present invention, the spectacle of loose belts in disorderly array on a vehicle seat is obviated. Further, the use of two hands to fasten a seat belt is unnecessary. The driver or passengers can each fasten and unfasten their individual belts with facility, using only one hand. Even more important, means are provided to resiliently retain a receptacle type anchoring component to accommodate a ready seat adjustment while maintaining maximum comfort for the wearer of the safety belt.

A primary object of the invention is to provide a safety belt which is economical to fabricate, more efficient and satisfactory in use, adaptable to a wide variety of applications and unlikely to malfunction.

Another object of the invention is to provide belt restraint means lending itself to a more orderly presence and a simplified and safer use.

Another object of the invention is to eliminate one of the belt segments normally comprising a seat belt component of the prior art structures. It is contemplated in accordance with this object of the invention to substitute for the eliminated belt segment a unique receptacle unit forming an effective part of a seat and offering simple unobtrusive access thereto for anchoring a single belt segment about the body.

A further object of the invention is to provide a belt receptacle which may retain an anchored relation to a vehicle while moving in unison with an adjustable seat unit.

Still another object of the invention is to provide safety belt means comprising a single belt element incorporating a rigid connector element for simplified slip fit to a novel receptacle having a yielding anchored connection to a vehicle frame.

A still further object of the invention is to provide a safety belt receptacle which may function in common with a plurality of individual belt segments wrapped around the body.

An additional object of the invention is to provide a safety belt assembly possessing the advantageous structural features, the inherent meritorious characteristics and the means and mode of use herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the drawings wherein some but not necessarily all the forms of embodiment of the invention are schematically illustrated.

FIG. 1 shows an invention assembly installed in an automotive vehicle;

FIG. 2 is a diagrammatic view showing the disposition of the anchoring elements of the assembly of FIG. 1;

FIG. 3 is a perspective view of an automobile seat schematically illustrating the disposition therein of the invention receptacle;

FIG. 4 is a sectional view illustrating in detail the application of belts to an anchoring receptacle unit;

FIG. 5 is a fragmentary view illustrating lock details of the apparatus illustrated in FIG. 4;

FIG. 6 is a cross-sectional view taken on line 6—6 of of FIG. 4;

FIG. 7 is a perspective view showing structural detail of the anchoring mechanism of the receptacle portion of the assembly of FIG. 6;

FIGS. 8 and 9 illustrate an adjustment feature of the invention assembly; and

Like parts are indicated by similar characters of reference throughout the several views.

Figure 10:
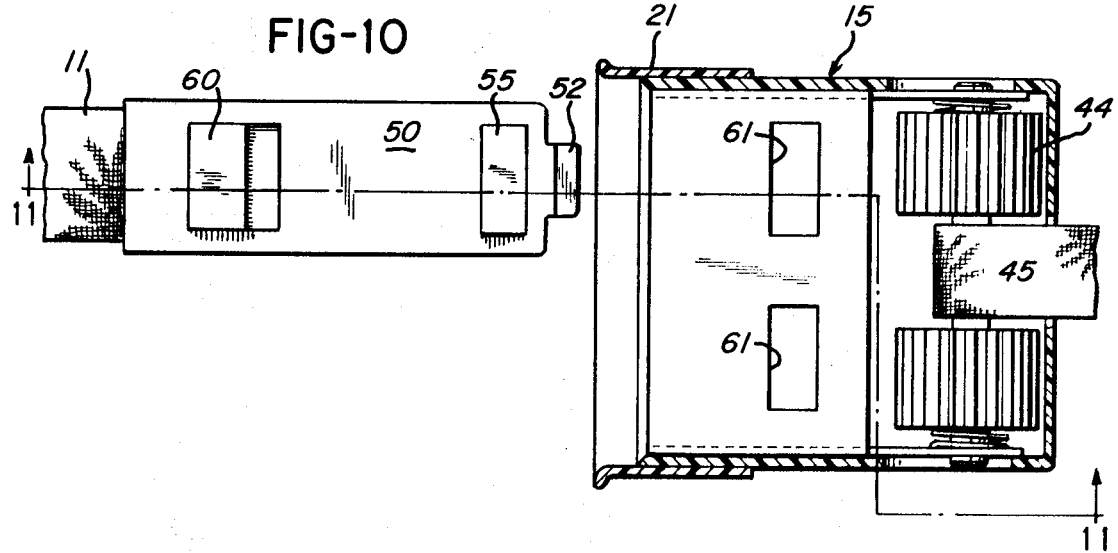
FIGS. 10 through 13 illustrate a modification of the invention embodiment of FIGS. 1 through 9 in various sectional views of such modification.

Referring to the drawings, there is diagrammatically illustrated in FIGS. 1 through 3 a seat unit 10 forming a part of a vehicle. Also shown are segments of two types of safety belts. A shoulder belt segment 11 and a lap belt segment 12 extend respectively from a roof anchor 13 and a conventional floor mounted reel 14 and are adapted to be drawn across the backrest and seat portions of the seat 10.

In accordance with the present invention the mating belt segments conventionally employed with a shoulder belt segment or lap belt segment are eliminated. In lieu of the mating belt segments lying on the vehicle seat, by the present invention there is mounted between the seat and backrest a receptacle 15. Ends of the belt segments 11 and 12 are installed in the receptacle 15, in a manner as will hereinafter more clearly appear, and there anchored in use. The receptacle not only obviates the need for belt segments on the vehicle seat but, as will be seen, facilitates fastening of the belts using only one hand.

As shown in FIGS. 4 and 6 through 9 of the drawings, the receptacle 15 includes a housing 16 anchored by means of a hinge 9 to the bottom of the frame of the seat 10 and tied further to the vehicle by a yielding connection at its lower end to a floor mounted bracket means 17. At its upper open end the housing 16 projects through the joint defined between the seat and backrest portions of the seat 10. So anchored to the vehicle and disposed between portions of the seat unit, as indicated, the receptacle has its open end or mouth 18 properly oriented to readily receive a connecting device on the end of a belt segment such as 11 or 12 here illustrated.

As shown in FIG. 4, the receptacle 15 may advantageously commonly receive both the belt segments 11 and 12. However, it will be obvious that a receptacle may be provided in a form to receive and anchor only one belt segment. In the illustrated instance, the housing 16 has fixed therein a metal divider 19 to define two pockets or sockets where the conjoint use of the belt segments 11 and 12 is contemplated. Thus, a belt segment 11, for example, may be anchored by introducing it into the receptacle 15 on one side of the divider 19 while the belt segment 12 may be individually anchored by insertion into the receptacle on the opposite side of the divider. It is noted that a cap 21 having a slightly flared construction is slidably mounted on the housing 16 about and to define an entrance or entrances to the mouth 18 thereof. The cap 21 is so formed to normally project and facilitate the insertion of a connector portion or device of a belt segment and so arranged to slide downwardly upon the receptacle housing when sat upon. It may, in the same connection, be made of a resiliently deformable material to impose no discomfort to the occupants of the seat 10.

The belt segments 11 and 12 are releaseably held in the receptacle 15 by a simple interlock mechanism. In the embodiment of FIGS. 1 through 9, according to the invention each belt segment has a connector device attached to the free outer end thereof.

The connector device 22 as schematically illustrated includes a generally rectangular housing 23 open to one end to receive therein the free extremity of the related web of the belt 11. This web is shown to be anchored to the housing by passage about a pin 24 fixed transversely of the housing adjacent the web opening thereto. The housing 23 includes a flat projected tongue-like extension 25 having therein a T-shaped aperture 26 adjacent its outer or leading end 27 which is flately tapered. Inwardly of the aperture 26 the extension 25 has a through passage 28 opening at its inner end to the interior of the housing portion 23 and at its outer end to the aperture 26. Slidably bearing in passage 28 is element 29 having to one end an expanded head portion 30 disposing in the aperture 26. The head portion 30 is so formed to preclude its entrance to the passage 28 and to serve other function as will be further described. The opposite end of element 29 has interconnected therewith a pair of spring elements 31, the respective extremities of which diverge to connect to button control elements 32. The latter slidably bear in aligned housing surface portions formed at opposite faces of the housing 23. As shown in FIG. 6, the construction will provide that portions of the buttons 32 are biased to normally project oppositely from housing 23 and on being pressed inwardly thereof will induce a sliding of head portion 30 in the aperture 26 of housing extension 25. Release of the buttons will inherently cause the buttons to be biased to return to their projected condition, whereupon the head 30 will seat to the intermost edge of aperture 26.

It must be emphasized that the detail of the belt connector device here described is relatively diagrammatic to illustrate the mechanics of the inventive concept. The physical incorporation of the mechanics illustrated may be achieved by various means which are within the comprehension of a mechanic versed in the art with the present disclosure before him. Such is contemplated by the present invention.

Turning now to the receptacle 15, this has a generally flat rectangular character except for its end portion 33 remote from its mouth 18. Referring to FIG. 6, the end portion 33 has a rectangularly expanded diagonally oriented form, one corner of which opens in line with mouth 18 and an opposite remote corner of which is flattened at 34 in a sense parallel to the mouth 18. The receptacle portion 34 includes therein an opening 35 for purposes to be further described. Looking to FIGS. 4, 6 and 7, it may be there seen that the receptacle 15 is laterally extended and contains therein a rectangular shell 36 which transversely bridges the recepacle housing and nests therein between its upper and lower plate surfaces and spaced therefrom. This shell opens at one end at the mouth of the receptacle and adjacent a pair of transversely spaced aligned apertures 37 formed in the cap 21. At the opposite end thereof, the shell opens to the expanded receptacle portion 33. Noting FIGS. 6 and 7, at the end thereof remote from mouth 18, the uppermost plate portion 38 of shell 36 has formed therein openings 39, portions 40 of the shell in the area of the openings being retained and offset over such openings to have connected thereto, in respect to each opening 39, a coil spring 41. The latter depends to bias inwardly of the shell a spring latch portion 42. As seen in FIG. 6, the latch portions 42 are fixed to incline inwardly of the shell 36, to either side of partition 19, to the end thereof which opens to the receptacle portion 33. This provides that there is in effect two passages formed in the shell 36 in each of which there is a spring latch in the direct path of a tongue-like extension 25 which may be inserted in the receptacle through an opening 37 in the cap 21.

Again viewing FIG. 6 and FIG. 4 of the drawings, it will be readily seen the housing 23 and its extension 25 on the belt segment 11 or 12, as the case may be, form a relatively rigid solid unit readily grasped in one hand to thrust the tongue 25, its leading edge 27 first, into the receptacle 15 by way of an opening 37 in cap 21. Since the opening 37 is in line with a defined pocket section in shell 36 to one side of the partition 19, the tongue 25 will be readily guided inwardly of the shell. In the process the leading edge of the tongue will engage and cam upward the latch 42 in its path, against the bias of spring 41. As such leading edge passes the latch 42, the latter will then drop into the head of the T-slot 26 at its forwardmost edge. The related belt segment which is connected to the housing 23 is thus anchored to the receptacle 15 to one side of the partition 19. Note that the receptacle is hingedly fixed to the seat frame and also tied to the floor.

In this last respect, it will be seen from FIG. 7 that in the expanded lower portion 33 thereof the receptacle incorporates a transversely disposed rotatable shaft 43. The ends of shaft 43 are connected to bear in rearward plate extensions 36' of the sides of the shell 36, in line with the respective openings to the receptacle. Secured in laterally spaced relation on shaft 43, spaced from each side of the divider 19, is a pair of sprocket wheels 44. Also connected to an wrapped on the shaft 43 on a spacer between and in end bearing relation to the wheels 44 is one end of a flexible belt segment 45. The opposite end of the segment 45 is passed through opening 35 in the receptacle portion 34 and anchored to the vehicle, as through the floor mounted bracket means 17.

The remote faces of wheels 44 are cylindrically recessed to each accommodate a torsion spring 46 wrapped about the shaft 43 and anchored at one end to the wheel 44 in which it nests and at the opposite end to the adjacent plate extension 36' on shell 36. The springs 46 serve to automatically wind the wheels 44 and the connected shaft 43 to cause the belt segment 45 to wrap tightly thereon. This adds a further anchoring factor to the seat belt employed in accordance with the present invention. Referring to FIG. 5 of the drawings, it will be seen that the taper on the leading edge 27 of the tongue 22 will on its insertion in a pocket defined in receptacle 15 bottom between teeth of a sprocket wheel 44. This not only defines the limit of insertion of the tongue but achieves a lock of the sprocket wheel against rotation. One thereby insures that the tension of the belt segment 45 is fixed at this point. However, if at any time one wishes to adjust the seat for comfort and security, the belt segments or segment which is engaged may be disconnected from the receptacle 15 to free the wheel or wheels 44 thereon, whereupon the seat may be shifted, the belt segment 45 automatically wrapping or unwrapping and remaining in a tensioned state throughout the entire procedure. Thus, as described, one achieves an accommodation of a new position of the seat, whereupon insertion of one or more connector devices to have its leading edge engage in the teeth of a wheel 44 will freeze the position of such wheels and the tensioned condition of the belt 45 at that moment.

Release of a device 22 is simply effected by grasping thereof with one hand and pressing inwardly on buttons 32 with the thumb and forefinger, whereupon head 30 will be biased and thrust forward in the aperture 26 to cam the engaged spring latch 42 associated therewith outwardly therefrom and permit the quick smooth withdrawal of the previously interengaged tongue.

It should now be readily apparent how simply and effectively one may apply a safety belt in accordance with the inventive concepts. Not only may a belt be applied with great facility, but the operation is such that even if one inadvertently forgets to apply the belt when starting a vehicle, one can apply it with one hand while the vehicle is moving. The ease of application, moreover, is such that one will automatically apply the belt without concerning himself with the time or mechanical involvement entailed. This is in distinct contrast to the requirement in prior art structures for definite manipulations with both hands to achieve the desired restraint. The adaptability of the invention units is a prime feature. The provision for accommodating an adjustment of a seat while maintaining the tension and positioning of the receptacle is highly desirable. Moreover, the nature of the receptacle form and the contained constituents affords a construction which is quite unlikely to malfunction and does moreover have features which will insure the maximum comfort of the wearer of a safety belt.

Attention is now directed to FIGS. 10 through 13 of the drawings which illustrate a modification of the invention as shown in FIGS. 1 through 9. Here is revealed a connector device 50 of different form than the device 22, with the receptacle structure being slightly modified to compensate for the changes.

Figure 11:
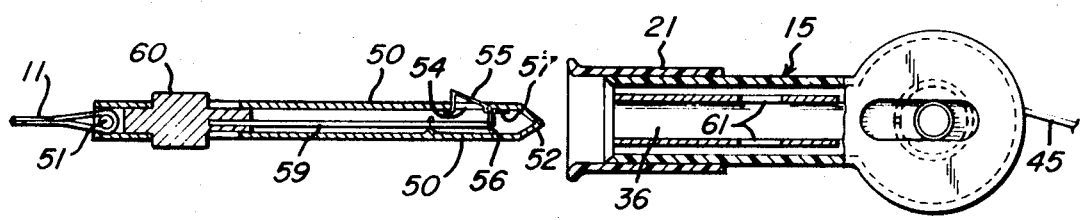
Figure 12:
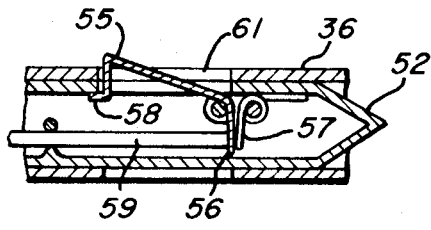
Figure 13:
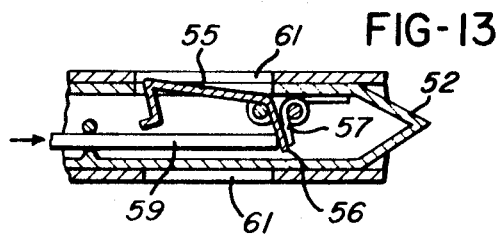

The device 50 is in its entirety of flat tongue-like configuration. It is hollow and transversely bridged at one end by a pin 51 to which a belt 11 or 12, as the case may be, may be suitably anchored. Its opposite end 52 is tapered as in the embodiment first described. Moreover, adjacent the tapered end thereof the device 50 has an aperture 54 in its upper surface through which projects a latch 55 which is hinged at the forward edge of the aperture. The latch 55 has a projection 56 inwardly of the hollowed chamber within the device 50. The projection is backed to normally depend perpendicularly by a spring 57, which is fixedly anchored in the interior of the device 50 adjacent its forwardmost tapered end. As seen in FIGS. 11 and 12 of the drawings, the latch has a limiting projection 58 which normally engages under the innermost edge of aperture 54 whereby to prevent its full displacement from the interior of device 50. The dependent portion 56 of latch 55 is normally abutted by the forward end of a rod 59 the rear end of which is engaged in a button 60 slidable in the interior of the device 50 to its inner end adjacent the connected belt web. Note further that the device 50 has opposed slots against its inner end through which project the control portions of the button 60.

The receptacle here illustrated in FIG. 10 is identical as to its components with that first described with the exception that the latch mechanism associated with the shell 36 is eliminated. The latter is instead provided with aligned apertures 61 in its upper and lower plate portions adjacent their inner most extremities.

In this case, on insertion of a flat tongue-like device 50 in the receptacle with one hand as previously described, the latch means 55 thereon will be cammed inwardly thereof until it registers with one of the apertures 61. The particular aperture 61 will depend upon which side of the tongue is up when the device is inserted. When registration occurs the latch means 55 will be biased to project upwardly through an aperture 61 and substantially simultaneously the tapered leading edge of the device will engage in a sprocket wheel 44, also as previously described. One thereby achieves a simple and quick latching of a belt segment to the receptacle. For release the button portions 60 are grasped between the thumb and forefinger and thrust forwardly, whereupon latch 55 is pivoted inwardly of the device 50, against the bias of spring 57. As this occurs, the device 50 can be quickly withdrawn with the one hand grasping the body thereof.

The modification of FIGS. 10 through 13 inclusive is merely presented to illustrate a simple but effective change which might be preferable under some circumstances, which change can be effected without departing from the spirit or the concept of the invention.

As noted previously, the illustrations are purely for representation of the invention and its embodiment and are not to be construed in any way as limiting. They have in the main been shown diagrammatically and only sufficiently as would be required for the reduction of the invention for practical uses by a mechanic versed in the art.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect.

Having thus described my invention, I claim:

1. For use in connection with a safety belt restraint device such as used in vehicles including a belt segment anchoring at one end to the vehicle and having a connector device at its opposite end; means defining a receptacle for disposition in a connected relation to the vehicle, said receptacle mounting to a seat unit for adjustment in unison therewith, said receptacle having means defining a mouth for entrance therein of said connector device and means for locking engagement to said connector device on its insertion in said receptacle, there being means for maintaining a required orientation of said receptacle, said receptacle providing means for slip fit insertion of said connector device with one hand means for interconnecting said receptacle with the vehicle for accommodating said unison adjustment while maintaining a predetermined tensioned placement of the receptacle in relation to the seat unit, and said interconnecting means including a yielding connection the yielding condition of which connection is adapted to be disabled on insertion of said connector device in said receptacle.

2. A restraint device according to claim 1 wherein said receptacle includes therein an interior means defining a guide for said connector device on insertion thereof in the receptacle, there being means in the path of said connector device on insertion for interlocking engagement therewith at a particular point of insertion.

3. A restraint device according to claim 1 characterized in that said yielding connection means has in connection therewith toothed wheel means and said connector device having a portion to interengage with said wheel means to prevent rotation thereof and thereby disable the yielding accommodation aforementioned.

4. A safety belt device consisting of a single belt segment having in connection therewith a tongue-like connector device and a receptacle having means for maintaining a predetermined constrained orientation thereof, said receptacle having means defining a guide for insertion of said connector device by a slip fit in one end of said receptacle and means within the receptacle for cooperation with said connector device to effect a lock therebetween and there being further means in said receptacle affording a yielding displacement of the position of said receptacle in a fore and aft direction and affording means engaged by said connector device on insertion in said receptacle for disabling thereof.

5. In a vehicle providing a seat adjustable relatively of the vehicle including a direction forwardly thereof and a safety belt mechanism including a vehicle anchored belt segments having a connector device on a free end thereof, a receptacle for said connector device movable normally with said seat and relatively to the vehicle and means operable automatically in response to insertion of said connector device into said receptacle to lock the receptacle against forward motion relatively to the vehicle.

6. A safety belt mechanism according to claim 5, wherein said receptacle is mounted on said seat to occupy normally a position of relatively fixed orientation in which a mouth of the receptacle is conveniently presented to receive said connector device in any adjusted position of said seat.

7. A safety belt mechanism in combination according to claim 5, characterized by means for releasing said connector device and automatically releasing the receptacle for unison adjustment with the seat.

8. A safety belt mechanism according to claim 5, characterized by a connection from the receptacle to the vehicle normally yielding in nature and automatically rendered non-yielding in an extensible sense by insertion of said connector device into said receptacle.

9. A safety belt mechanism according to claim 8, wherein said connection includes a flexible member anchored at one end to the vehicle, said receptacle embodying a biased reel to which the other end of said flexible member is attached, said member winding and unwinding on said reel in response to forward and rearward adjustment of the seat in a manner to obviate formation of slack in the connection of said member to the vehicle, and said connector device having means thereon to engage and lock said biased reel against rotation.

10. For use in combination with one or more safety belt elements comprising a single belt segment having in connection therewith a tongue-like connector device, a receptacle having means in connection therewith for maintaining a predetermined constrained orientation thereof, said receptacle having guide means to facilitate a slip fit insertion of at least one said connector device, means within the receptacle for cooperation with said connector device to effect a lock therebetween and means in connection with said receptacle adapted to be anchored to a fixed frame of reference arranged to accommodate a yielding displacement of said receptacle in a fore and aft direction and said last named means including a portion which on insertion of said connector device in said receptacle is rendered effective to prevent said yielding displacement.

11. A restraint device according to claim 10 characterized in that said portion includes wheel means a portion of which is adapted to be intercepted by said connector device on insertion thereof in said receptacle to thereby disable said yielding displacement feature.

12. A safety belt device according to claim 10, characterized in that the means for effecting a lock in said receptacle includes means arranged to dispose in the path of said connector device on insertion and adapted to interengage therewith at a particular point of insertion.

13. A safety belt device according to claim 10, characterized by said receptacle having defined therein a plurality of guides for insertion of plural connector devices related to different belts, and said means affording a yielding displacement of the receptacle being common to said guides.

References Cited

UNITED STATES PATENTS

| | | | |
|---|---|---|---|
| 2,855,028 | 10/1958 | Matthews | 297—385UX |
| 2,945,275 | 7/1960 | Alemeter | 297—385X |
| 3,494,664 | 2/1970 | States | 297—385X |

JAMES C. MITCHELL, Primary Examiner

U.S. Cl. X.R.

297—388